March 2, 1937. G. E. HAMPTON 2,072,750
PORTABLE ELECTRIC SAW
Original Filed July 13, 1932  2 Sheets-Sheet 1

INVENTOR
George E. Hampton
by
his attorney

March 2, 1937.  G. E. HAMPTON  2,072,750
PORTABLE ELECTRIC SAW
Original Filed July 13, 1932   2 Sheets-Sheet 2
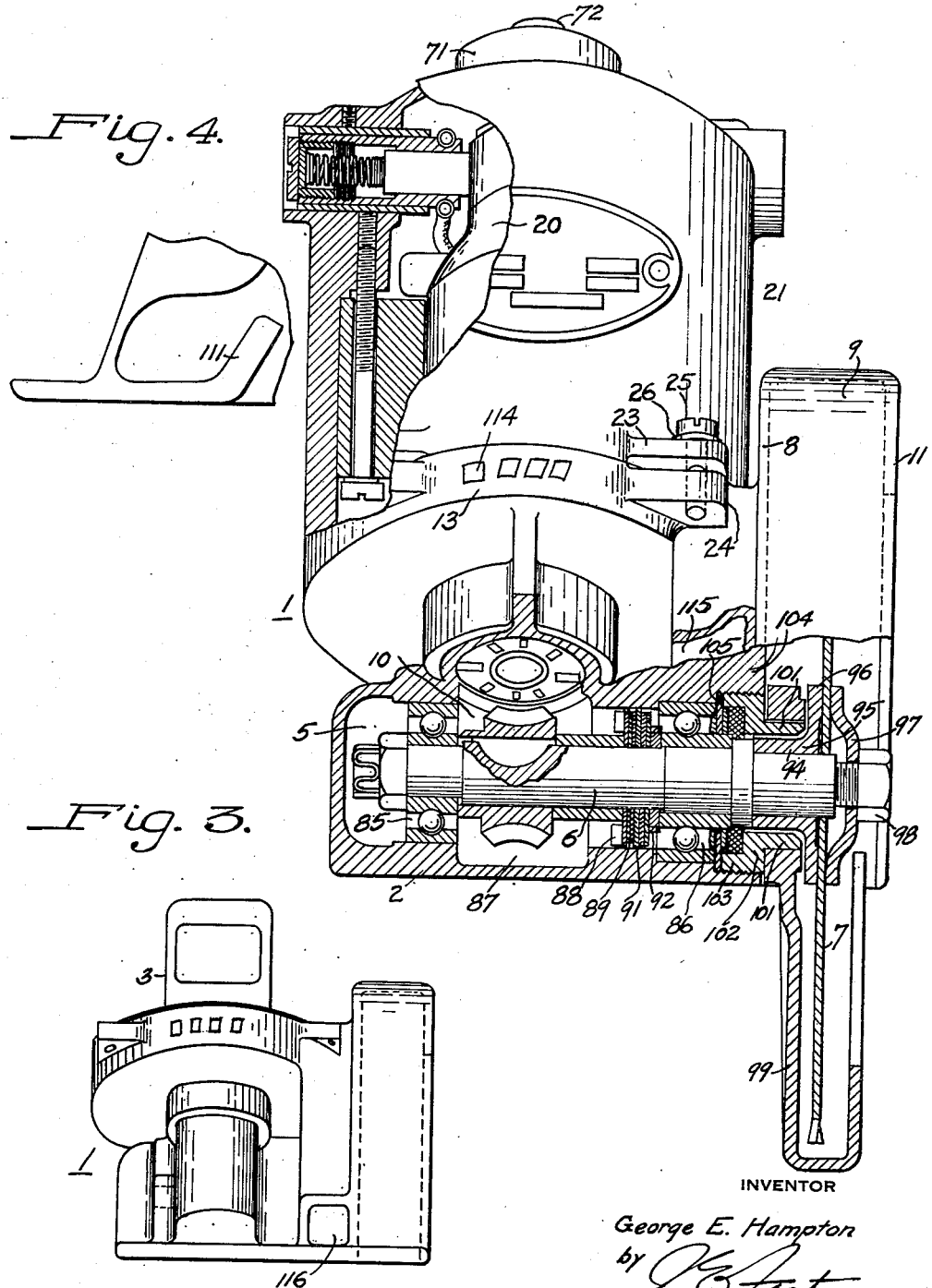
INVENTOR
George E. Hampton
by
his attorney Patented Mar. 2, 1937

2,072,750

UNITED STATES PATENT OFFICE 2,072,750

PORTABLE ELECTRIC SAW

George E. Hampton, Pittsburgh, Pa.

Refiled for abandoned application Serial No. 622,199, July 13, 1932. This application July 26, 1934, Serial No. 737,069

4 Claims. (Cl. 143—43)

This invention is a substitute application for my application filed July 13, 1932, Serial No. 622,199.

This invention relates to an electric saw of the portable type.

Among the objects of the invention are to provide a saw of simplified construction and design that shall be economical to manufacture and of rugged construction, while being at the same time relatively light in weight in comparison with present saws of the same capacity.

Other objects of the invention are to provide structural and design features that contribute to the general efficiency and satisfactory construction and operation of the saw.

One main consideration sought in the design of the saw which I disclose herein has been to make the saw as light in weight as possible so that it could be readily handled without tiring an operator; and also to make the saw of such design that it might be easily or readily assembled, or taken apart if such action should become necessary for cleaning or repair.

Another object is to provide a simple design whereby the electric circuit to the motor of the saw may be easily and readily established or broken, respectively by placing the motor assembly in position or by withdrawing it from operative position.

Another object is to provide a light saw of such design that it may be readily handled and operated with one hand.

The portable saw, as I have constructed it, comprises a flat base plate that is adapted to rest upon and slide across the surface of material that is to be worked upon. A drive shaft is rotatably supported between bearings suitably mounted in transverse alignment on the plate, and serves to drive a saw blade or other similar cutting tool with which the work is to be done. The drive shaft is rotated by an electric motor that is operatively connected to the drive shaft through a worm and gear connection. The shaft and the motor, together, with the connecting gears are suitably enclosed in communicating and connected casings to enclose the motor and the shaft gears against dirt and dust, and to safeguard the operator. The upper end of the motor casing is supported on and connected to the base casting, which also embodies a hollow casing that serves as the handle for manipulating the saw. The handle is of sufficient length to provide the proper space for the grip of an operator's hand but is not larger than sufficient size so that no more metal will be used than is actually essential.

When cutting wood along a predetermined line that is to define or indicate the path of the cut, the line is likely to become obscured by the sawdust that is made by the saw when cutting. In order to prevent accumulation of such sawdust in the path of the saw blade, the motor is provided with a fan element to generate a stream of air which is conducted and guided by a properly located passage leading from the fan blade to the front end of the base plate to cause the stream of air to blow the particles of sawdust away from the path of travel to be traversed by the blade.

Other structural features of design whereby the saw may be easily assembled with a minimum amount of time and expense are also provided which will be referred to in detail in the following description of the saw when considered in connection with the accompanying drawings, in which Figure 1 is a side sectional view through the saw showing some of the elements in elevation;

Figure 2 is a front view of the saw partially in elevation and partially in section with parts broken away to show the construction and the manner of assembly of various elements of the saw;

Figure 3 is a front elevational view of the base plate casting and shows the location of the orifice for the air stream to move the sawdust;

Figure 4 is a front view of the lug supporting a backstop bumper for the movable guard;

Figures 1, 5, 6:
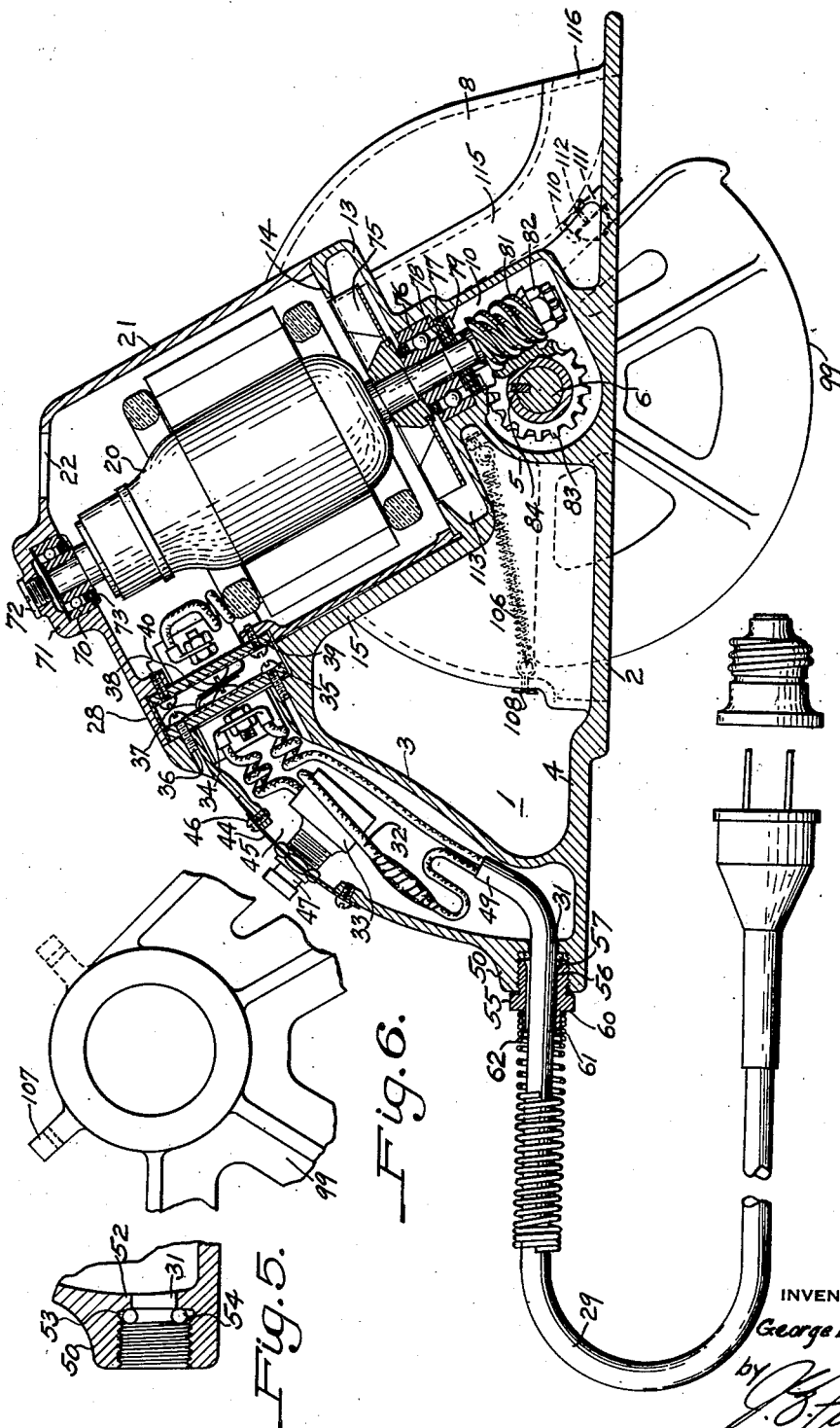
Figure 5 is an enlarged sectional view of the lower end of the handle and shows the cable grip ring in position.
Figure 6 is a side view of the hub of the guard showing the two limit positions of the spring anchor arm for the guard.

As shown in the accompanying drawings, with particular reference to Figures 1 and 2, the saw is provided with a main body casting 1, embodying a flat base plate 2, with a hollow handle 3 connected to the back end of the flat base plate 2 by a short flat connecting section 4, and a walled recess or chamber 5 extending transversely across the middle of the base plate to accommodate a drive shaft 6 for a saw blade 7. The main base casting also embodies a vertical semi-circular wall section 8 solidly connected along one side edge to the base plate with a semi-circular channel 9 formed by the wall 8 and a short flanged section 11.

The channel 9 encircles the upper part of the saw blade, extending radially inward sufficiently to cover the teeth or edges of the saw blade to serve as a guard therefor.

The top wall of the drive shaft chamber 5 extends upwardly to form and enclose a motor shaft and chamber 10. A substantially circular anchor plate 13 constitutes a flange extension of the motor shaft chamber wall and serves as a base to which the motor assembly may be secured. The anchor plate 13 is provided with a partition 14 parallel to the anchor plate and spaced therefrom. The partition 14 extends inwardly and co-operates with the base plate and a connecting wall to constitute a fan housing in which the cooling fan for the motor may rotate. A connecting strip 15 is disposed between the upper end of the handle 3 and the rear side edge of the anchor plate 13.

The motive power for the saw is derived from an electric motor 20, encased in a cylindrical cup shaped casting 21 that is substantially closed at one end except for a plurality of ventilating slots 22, and that is open at the other end to permit the open end of the casting 21 to rest against the partition 14 of the base casting, to be secured thereto.

The motor casting 21 is provided with four corner lugs 23 arranged to be aligned with similar corner lugs 24 on the anchor plate 13 of the base casting. The two sets of corner lugs are fastened together with threaded bolts 25 and lock washers 26, thereby anchoring the motor housing securely on the base casting. The upper end of the motor housing 21 is provided with a rectangular hollow off-set 28 on the side of the housing adjacent the handle. The rectangular off-set 28 is hollow to provide a communicating passage between the inside of the hollow handle 3, so that electrical circuit connections may be made to the motor, through the handle and the off-set 28.

Operating energy is supplied to the motor through a cable 29 with two or more conductors extending through an opening in a boss 31 at the base of the hollow handle 3. One circuit conductor 32 is controlled by a switch 33 to open or to close the circuit to the motor. The two circuit conductors are secured to two terminal posts 34 that are supported upon an insulating plate 35 that is anchored in position on the upper end of the handle by means of suitable positioning screws 36. Flexible bent springs 37 are mounted on the outer surface of the insulating plate 35 and are respectively connected to the terminals 34 to which the cable conductors are connected, in order to permit electrical contact to be easily and readily made between the bent resilient spring contacts 37 and a pair of similar contacts 38 mounted on an insulating plate 39 that is similarly anchored on the motor housing by anchoring screws 40.

The insulating plate 39 is secured within the offset portion 28 which also serves to encircle the insulating plate 35 when the motor housing is clamped in position on its base plate. By means of this construction electrical contact may be easily and readily made during assembly with a minimum amount of time and effort since the contacts are established between the resilient spring contacts 37 and 38 by the mere placing of the motor housing in position.

This feature of the design construction permits the electrical circuit to be made or broken automatically when the motor is placed in position or removed therefrom. The time and labor of assembly are thus reduced to a minimum. Likewise, the motor may be easily removed for repair without requiring disconnection of any electrical connections. It is therefore important as a construction detail.

The switch 33, by means of which the circuit to the motor is controlled, is suitably mounted upon an orifice plate 44 that covers an opening 45 in the upper part of the outer surface of the handle, through which the switch 33 may be inserted after the circuit conductors are connected in position on the switch. The orifice plate 44 is anchored in position on the handle by suitable screws 46. The switch is of the type that is biassed to remain in, or to normally move itself to, its open position, and must be held in its closed position by depressing a plunger or button 47.

By constructing the handle as illustrated, the saw may be held and manipulated with one hand. The lower end of the handle is provided with an outwardly extending boss 50 which serves as a stop or rest for the base of the palm of the operator's hand. Around that point as a fulcrum, the saw may swing downward due to gravity, or it may be lifted upward by the fingers of the operator as they are closed to grip the handle. The switch 33 can then be depressed by the thumb or by the natural gripping of the handle to close the motor circuit. When the saw is permitted to swing downward away from the thumb, the switch is permitted to open. The saw may thus be manipulated to operate, or to rest, by the use of the fingers of one hand of the operator.

In connection with a portable electric tool it is a problem to properly anchor the electric conductor cable where it first engages the body or casing of the tool, as in this instance where it enters the handle. It is also desirable to prevent sharp bending of the cable at that point, so that the cable will not shift position or break during manipulation of the tool.

The cable usually employed for such application is the same as that illustrated here, in which the electrical conductors are covered by a cylinder 49 of rubber or of rubber composition.

In order to provide the proper anchor and support for the rubber cable, the handle is shaped as illustrated in Figure 1 to embody the hollow boss or extension 50 with an orifice or opening 31, through which the cable may pass with a relatively loose sliding fit. The boss 50 is internally threaded behind the orifice to a larger diameter. The threaded section of the boss 50 is spaced, by a narrow channel 53 from the wall 52 in which the orifice 31 is located.

A cable grip ring 54 of compressible material such as lead wire or the like surrounds the rubber cable 49 and rests against the inner shoulder of the orifice wall 52 adjacent the channel 53. A threaded strain relief nut 55, having a threaded shank 56, threadedly fits into the threaded portion of the boss 50 at the base of the handle. The threaded shank 56 is provided with an internal tapered or flared front end section 57 which is adapted to engage the outer surface of the cable grip ring 54 and to compress the ring tightly against the rubber surface of the cable 49. The cable grip ring 54 when compressed to grip the cable, serves to prevent shifting of the cable in either direction, since the ring is held against movement in an outer direction by the strain relief nut 55, and is held against inward movement due to its resting against the inner wall 52. The threaded strain relief nut 55 is provided with a head 60 by means of which it may be manipulated and the head 60 has an outwardly extending threaded end rest or seat 61 upon which the terminal convolutions of a helical spring 62 are threaded and anchored, to hold the helical spring 62 in position to prevent the cable from being bent too sharply, which would result in a break or crack in the cable.

By means of the construction which I have illustrated herein, involving a small compressible grip ring around the cable and a threaded nut with an inwardly tapered shank for engaging the ring and compressing it to grip the cable surface tightly, I am enabled to provide a satisfactory gripping device for the cable that is relatively inexpensive and that is efficient and satisfactory in its operation, and that is easy and therefore inexpensive to apply and assemble.

As illustrated in Figure 1 the upper end of the motor shaft is supported in a roller bearing 70 mounted in the end bell or closed end 71 of the motor casing 21. A flat head screw 72 is provided to permit lubricating oil to be applied to the bearing 70. A felt oil washer 73 is supported between the two races of the ball bearing to prevent the oil from dripping down upon the rotor of the motor.

The lower end of the motor shaft has mounted thereon a fan blade 75 just above a lower ball bearing 76 in which the lower end of the motor shaft is supported. A felt oil washer 77 is mounted on the shaft directly beneath the inner race of the lower roller bearing 76 where the bearing is mounted on the motor shaft. A spacing washer 78 is provided as a backing for the felt washer 77. Below the felt washer on the motor shaft is mounted an oil impeller 79 for the purpose of drawing oil back into the gear compartment 5 that tends to creep up along the motor shaft. The lowest end of the motor shaft supports a worm 91 secured to the shaft, and held against rotary movement and limited as to longitudinal movement by a lock nut assembly 82. The worm 81 engages and drives a worm gear 83 mounted on and keyed to the drive shaft 6 by a key 84. The drive shaft 6 for the saw blade is supported between two axially aligned ball bearings 85 and 86 supported between the walls of the gear chamber 5. The central part of the gear chamber 5 is recessed to form a reservoir 87 for the lubricant to be supplied to the gear assembly.

The drive shaft 6, between the oil reservoir 87 and oil bearing 86, is provided with an oil impeller 88 to prevent excessive oil creepage along the shaft towards the outer bearing 86. Behind the impeller are disposed an oil retaining washer 89 and a felt oil washer 91 which are both held in proper position on the drive shaft by a spacing washer 92 which rests against the inner race of the ball bearing 86. The outer end of the drive shaft 6 is provided with an arbor washer 94 embodying a sleeve section 95 with two internal diametrically opposite flat surfaces whereby driving connection may be made with the outer end of the drive shaft which is similarly provided with two diametrically opposite flat surfaces. The sleeve portion 95 is provided with a flange plate 96 with which a saw clamp washer 97 cooperates to lock a saw blade 7 on the rotatable drive shaft 6. The washer 97 is held in position by means of a screw 98 threaded into at the end of the drive shaft 6.

In order to protect the saw operator while the saw is not in use, or while the motor is energized, or before the saw is put into use, a guard 99 is provided for the lower half of the saw blade 7. The guard 99 is pivotally mounted to rotate upon a sleeve portion 101 constituting a part of a threaded bearing clamp and guard pivot support 102. The pivot support 102 is preferably of brass to properly support the guard ring. The support also embodies a threaded sleeve 103 which is threaded into the wall 104 of the base casting where it abuts against the outer race of the ball bearing 86 to hold the bearing 86, for shaft 6 and felt washer 105 in position. The sleeve portion 101 of the bearing clamp serves as a pivotal support for the guard 99 so that the guard may rotate around the sleeve 101 and move up into and within the channel 9. The semi-circular housing including flange 11 that encloses the channel 9 surrounds and guards the upper part of the saw.

The oscillating guard 99 is biassed to its lowermost position by a spring 106 anchored at one end on an extending finger 107 on the oscillating guard 99 and at its other end to a cotter pin 108 anchored at the lower end of the channel wall.

By anchoring one end of the spring on the extending finger 107, the body of the spring is held out from the hub of the guard so that the spring may be effective throughout its entire length and throughout the entire angle through which the guard may turn. The finger 107 is disposed on the hub at an angular distance from the vertical corresponding to about half of the complete angle through which the guard may move.

In order to limit the stress of impact of the guard when it is swung back to its initial starting position by the spring 106, a rubber button 110 is anchored on a bracket 111 extending upward from the base plate and outward from the side wall 8 of the semicircular channel enclosure. The bracket is disposed to support the rubber button as a bumper for the guard in the return path of travel of the guard. The button is anchored on the bracket by a pin 112 extending through a hole in the bracket and bent over. This provides a simple inexpensive bumper for the guard.

The fan blade 75 on the lower end of the motor shaft rotates in a chamber 113 in the fan housing between the anchor plate 13 and the partition 14. This fan 75 during rotation draws in a stream of air through openings 22 in the end wall of the motor housing, which ventilates and cools the motor. The air is drawn in at the open center of the rotating fan blade and then forced out radically by centrifugal action into the space of the surrounding chamber 113. Part of this stream of air is expelled through openings 114 in a side wall of the fan housing on the anchor plate 13, and the balance of the air is directed into chamber 115 and out through an orifice 116 towards, and in the direction of the path of travel of the saw blade, immediately in advance of the saw blade. Saw dust tending to cover an indicated path or line of travel is blown away so the line will not be obscured.

The disposition of the motor and worm gear are such as to permit the entire rotor assembly to be inserted or withdrawn.

The construction of the sliding contacts at the top of the handle permits the circuit connections between the switch and the motor to be made or broken automatically when the rotor is inserted or withdrawn.

The anchoring assembly for the cable, at the handle, prevents shifting of the cable and attendant stressing of the conductors. The shape of the handle and the disposition of the switch permit the saw to be handled and operated with one hand.

By the use of a unitary base or main casting for the mechanism and for supporting the motor housing, a simple compact structure is provided that is simple and inexpensive to make and assemble.

My invention is not limited to the specific details of design as illustrated, but may be variously modified without departing from the spirit and scope of the invention, as set forth in the appended claims.

I claim as my invention:

1. An electric portable saw comprising a base-plate having two spaced integral bearing housings thereon in transverse alignment, one housing being in a compartment closed to the outside and the other open to the outside, a ball bearing in each housing, a shaft supported in and between the bearings and extending out of the open housing beyond the base plate, a worm gear on the shaft between the two bearings and rotatable in a gear chamber between the bearings, an oil impeller on the shaft between the gear and the outer bearing and effective towards the gear chamber, an oil washer behind the impeller and between the impeller and the outer bearing, an oil washer on the outer side of the outer bearing and against the shaft, and a threaded clamp ring for the outer oil washer having a portion serving as a bearing for a rotatable guard element for the saw.

2. A portable electric motor comprising an operating motor and a housing therefor; a saw blade, an operating and supporting shaft therefor; a switch for controlling the motor circuit, and a single piece casting embodying a guiding base plate, an integral housing on the base plate for enclosing the operating shaft, an integral guard on the base plate for enclosing the upper shaft half of the saw blade, and an integral handle on the base plate to enclose the control switch and to manipulate the saw structure.

3. A portable electric motor comprising an operating motor and a housing therefor; a saw blade, an operating and supporting shaft therefor; a switch for controlling the motor circuit, and a single piece casting embodying a guiding base plate, an integral housing on the base plate enclosing the operating shaft, an integral guard on the base plate to enclose the control switch and to manipulate the saw structure; and a return spring biassed guard for the lower part of the saw blade.

4. In a portable electric saw, the combination with an electric motor and a motor-driven shaft for operating a saw blade, of a blade fitting on the shaft, a movable guard for encircling the operating exposable zone of the blade, an arbor washer for positioning the blade on the shaft, a bearing ring encircling the arbor washer and spaced therefrom and having a bearing sleeve for pivotally supporting the movable guard, the arbor washer embodying a sleeve on the shaft and flanged washer to serve as a rest for the saw blade, the flanged washer serving to retain the guard on the bearing sleeve while the arbor washer is held in position on the shaft, a clamp washer on the other surface of the saw blade, and a single bolt adapted to be anchored in the end of the shaft for locking the clamp washer, the saw blade and the arbor washer in position on the shaft.

GEORGE E. HAMPTON.